_United States Patent_ [19]

Krutak, Sr.

[11] 3,903,108

[45] Sept. 2, 1975

[54] PRODUCTION OF 2-ARYLINDOLES

[75] Inventor: James J. Krutak, Sr., Kingsport, Tenn.

[73] Assignee: Eastman Kodak Company, Rochester, N.Y.

[22] Filed: May 1, 1974

[21] Appl. No.: 465,981

Related U.S. Application Data

[63] Continuation of Ser. No. 264,689, June 20, 1972, abandoned.

[52] U.S. Cl. .................. 260/319.1; 260/326.12 R; 260/326.13 R; 260/326.14 R; 260/326.15
[51] Int. Cl.² ............. C07D 209/04; C07D 209/08
[58] Field of Search ............................... 260/319.1

[56] References Cited

OTHER PUBLICATIONS

Theilheimer, "Synthetic Methods of Organic Chemistry," Vol. 18, p. 372, No. 864, (1964).

_Primary Examiner_—Lewis Gotts
_Assistant Examiner_—S. P. Williams
_Attorney, Agent, or Firm_—Elliott Stern; Daniel B. Reece, III

[57] ABSTRACT

The production of 2-arylindoles from α-haloarylacetaldehyde dialkylacetals and primary or secondary aromatic amines is disclosed. These indoles are useful in the production of cationic dyestuffs having excellent properties.

5 Claims, No Drawings

PRODUCTION OF 2-ARYLINDOLES

This is a continuation, of application Ser. No. 264,689 filed June 20, 1972, now abandoned.

This invention relates to a novel method for producing 2-arylindoles. More particularly, this invention relates to the production of 2-arylindoles from α-haloarylacetaldehyde dialkylacetals and primary or secondary aromatic amines. The 2-arylindoles produced by the process of this invention are useful in the production of cationic dyestuffs which exhibit excellent physical properties. (See for example, U.S. Pat. Nos. 3,148,935 and 3,136,751).

By indole it is meant one of a group of organic heterocyclic compounds in which a benzene ring is fused to a pyrolle ring according to the following formula:

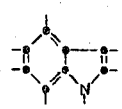

Representative of the known processes for preparing indoles is the Fischer indole synthesis whereby an arylhydrazone of an aldehyde or ketone on treatment with an acid is converted into an indole. Specifically, for example, when the starting material is the phenylhydrazone of acetophenone, the product is 2-phenylindole. Of further interest is U.S. Pat. No. 3,534,059, issued Oct. 13, 1970, which discloses another process for making indoles, i.e., by effecting a reaction between an aromatic amine and a gem-dihalocyclopropane containing at least one hydrogen on the cyclopropane ring. However, these prior known processes leave much to be desired from a commercial standpoint.

Therefore, an object of the present invention is to provide a process for the production of 2-arylindoles which is unique and which is more economically attractive than the processes heretofore known.

Other objects of this invention will become apparent from the following description.

According to this invention, a novel process for the production of 2-arylindoles has been found which comprises admixing an α-haloarylacetaldehyde dialkylacetal with an aromatic amine at a temperature of from about 70° to 200°C. for a period of at least about 30 minutes; said aromatic amine containing six nuclear carbon atoms, from 6 to about 30 carbon atoms in the total molecule, at least one hydrogen attached to the nitrogen of the amino group, and at least one hydrogen on the aromatic nucleus ortho to the amino group.

The term α-haloarylacetaldehyde dialkylacetal as used herein refers to a group of compounds having the following structure

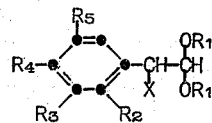

wherein $R_1$ represents alkyl having 1–6 carbon atoms; $R_2$, $R_3$, $R_4$ and $R_5$ represent hydrogen, an inorganic radical such as a halide, or an organic radical having from 1 to about 20 carbon atoms, and X represents a halogen radical. Preferably $R_1$ represents methyl or ethyl; $R_2$, $R_3$, $R_4$ and $R_5$ are the same or different and each represents hydrogen, alkyl, alkoxy, cyano, sulfamoyl, alkanoylamino, nitro, alkylsulfonyl, carboxy, —$SO_3H$, halogen, alkoxycarbonyl, arylazo, $SO_2F$ or dialkylamino; and X represents chloro or bromo. In an especially preferred embodiment of this invention $R_2$, $R_3$, $R_4$ and $R_5$ represent the above mentioned radicals except that the groups that contain alkyl moieties have from one to about six carbon atoms. As used herein to describe a substituent containing an alkyl moiety; the term "lower" designates a carbon content of up to about six carbon atoms.

Any of the wide variety of the aromatic amines may be utilized in the process of this invention, the only requirement being that the amine contain at least one hydrogen substituent on the aromatic nucleus ortho to the amino group and at least one hydrogen atom on the amino group itself.

Preferably, the aromatic amine will contain not more than 6 to 30 carbon atoms in the total molecule. The preferred amine reagent is depicted by the following structural formula:

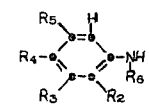

wherein $R_2$, $R_3$, $R_4$ and $R_5$ are defined as above and $R_6$ represents hydrogen, alkyl, or alkyl substituted with halogen, alkoxy, alkylsulfonamido, alkanoylamino, hydroxy, alkoxycarbonyl or cyano. Preferably, $R_6$ represents hydrogen, lower alkyl, or lower alkyl substituted with lower alkoxy, lower alkylsulfonamido, lower alkanoylamino, lower alkoxycarbonyl or halogen, hydroxy or cyano.

The process is to be conducted at temperatures which are sufficient to produce the desired 2-arylindole product but insufficient to decompose the product. These results are achieved by conducting the process at a temperature within the range of from about 70° to 200°C. and preferably from 100° to about 190°C. Of course, the preferred or optimum temperature varies between these ranges depending upon the specific reagents employed. The time required to complete the reaction will vary with the reactants, however, it has been found that periods of greater than 30 minutes are usually sufficient to complete the reaction, preferably at least about 2 hours.

Generally speaking the process may be conducted under standard atmospheric pressure in an atmosphere of nitrogen.

The reagents may be generally employed in stoichiometric proportions owing to economic considerations, i.e., one mole of aromatic amine to one mole of α-haloarylacetaldehyde dialkylacetal. The proportions can, however, range from 10 moles to one mole of amine per mole of α-haloarylacetaldehyde dialkylacetal. It has been found especially advantageous to use at least two mole proportions of aromatic amine, i.e., one mole proportion to react stoichiometrically with the α-haloarylacetaldehyde dialkylacetal and one mole to accept the one mole proportion of acid which also results from the reaction. This reaction proceeds according to the following equation (Aniline and 2-bromo-2-phenylacetaldehyde dimethylacetal are used as examples for the general reaction):

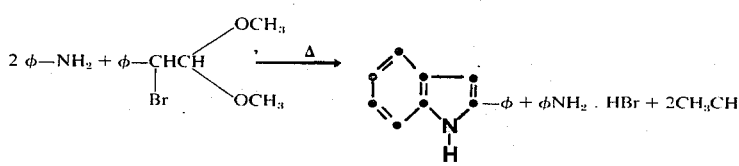

Alternatively, one mole proportion of aromatic amine and one mole proportion of α-haloarylacetaldehyde dialkylacetal may be used in the presence of a proton accepting reagent such as triethylamine, pyridine, dimethyl pyridine, the alkali metal carbonates, bicarbonates, or acetates, $Al_2O_3$, BaO, $Ca(OH)_2$, CaO, etc. Furthermore, it has been found advantageous to run the above reaction in the presence of a solvent which is inert to the reagents and product. This solvent should have a boiling point of between about 70° and 200°C., especially preferred are the aromatic solvents such as dichlorobenzene, toluene, xylene, etc, as well as hydroxylic solvents such as ethylene glycol and methyl cellosolve.

After the reaction is completed, which usually takes from about 30 minutes to about 2 hours, the reaction mixture is allowed to cool to room temperature and it is then poured into ice water containing a sufficient amount of hydrogen chloride to neutralize any excess amine, if any. The 2-arylindole product separates as a powder. The 2-arylindole may then either be filtered or extracted with methylene chloride or any other suitable solvent.

The following examples are included for a better understanding of this invention.

EXAMPLE 1

A solution of 1 mol 2-bromo-2-phenylacetaldehyde dimethylacetal in 5–10 mols aniline is heated to the reflux temperature under an atmosphere of nitrogen. After 3 hours the solution is allowed to cool to room temperature and poured onto ice and water containing a sufficient amount of hydrogen chloride to neutralize the excess aniline. The 2-phenylindole product separates as a pale yellow powder. The indole is extracted with methylene chloride, washed with water, 5% sodium bicarbonate, and again with water. Evaporation and drying of the residue gives pale yellow crystals, 1 mol (100% yield), m.p. 186°–189°C. One recrystallization from alcohol gives white crystals, m.p. 189°C. The product, 2-phenylindole, has the following structural formula:

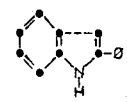

EXAMPLE 2

The same procedure is followed as in Example 1 except as follows, 4-methoxy aniline is used in place of aniline. The product, 5-methoxy-2-phenylindole, is obtained in 90% of theoretical yield.

EXAMPLE 3

The same procedure is followed as in Example 1 except as follows: N-methyl aniline is used as the aromatic amine. The product, 1-methyl-2-phenylindole, is obtained in 95% of theoretical yield and has the following structural formula:

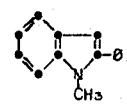

EXAMPLES 4–10

The following compounds are prepared in accordance with the procedure described in Example 1 with the exception that different reactants are utilized as indicated.

| Example | Amine | Compound | Isolated Yield (%) | Estimated Actual Yield (%) |
|---|---|---|---|---|
| 4 | p-toluidine | | 90 | 100 |
| 5 | N-hydroxyethyl-o-toluidine | | 95 | 100 |
| 6 | m-chloroaniline | | 70 | 90 |
| 7 | N-ethyl-m-acetamidoaniline | | 60 | 90 |

| Example | Amine | Compound | Isolated Yield (%) | Estimated Actual Yield (%) |
|---|---|---|---|---|
| 8 | N-ethyl-2-methoxy-5-acetomidoaniline | 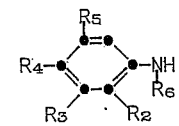 | 20 | 50 |
| 9 | metanilamide | | 70 | 90 |
| 10 | N-methoxycarbonylethylaniline | | 80 | 90 |

The α-haloarylacetaldehyde dialkylacetals employed in the practice of this invention may be prepared according to the known procedures for preparing acetals. For example, see Bedoukian, J. Chem. Am. Chem. Soc., Vol. 66, Pgs. 651 and 1325 (1944); Organic Synthesis, Vol. 29, Pg. 15 (1949); Organic Synthesis, Vol. 23, Pg. 8 (1943).

The aromatic amines which are used in the present process are either available commercially or can be easily synthesized by known procedures. Exemplary of these aromatic amines which are used in the present process are 4-isobutylaniline, ortho-anisidine, meta-chloroaniline, ortho-chloroaniline, para-chloroaniline, ortho-chloro-p-anisidine, 4-hydroxyaniline, ortho-dianisidine, 2,5-dichloroaniline, n-ethyl-o-toluidine, ortho-toluidine, para-toluidine, 6-phenoxyaniline, 4-cyclohexaniline and the like. The preferred aromatic amines are aniline and N-methylaniline.

Although the invention has been described in considerable detail with particular reference to certain preferred embodiments thereof, variations and modifications may be effected within the spirit and scope of the invention.

I claim:

1. Method of preparing a 2-arylindole which comprises the steps mixing one mole proportion of an α-haloarylacetaldehyde dialkylacetal having the formula

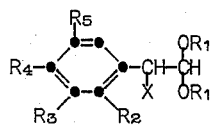

with at least one mole proportion of an amine compound having the formula and heating the mixture for at least about 30 minutes at a temperature between about 70°–200°C., wherein $R_1$ represents methyl or ethyl;

$R_2$, $R_3$, $R_4$ and $R_5$ represents hydrogen, methyl, ethyl, chloro, acetamido, methoxy or sulfamoyl;

$R_6$ represents hydrogen, methyl, ethyl, hydroxyethyl, or methoxycarbonylethyl; and X represents chloro or bromo.

2. Method of claim 1 which comprises conducting the reaction in the presence of an aromatic organic solvent which is inert to both the reactants and the product, said solvent having a boiling point of between about 70°–200°C.

3. Method of claim 1 conducted in the presence of at least 2 mole proportions of amine.

4. Mehtod of claim 1 conducted in at least one mole proportion of a proton accepting reagent.

5. Method of claim 4 wherein the proton accepting reagent is selected from pyridine, triethylamine, dimethylpyridine and the alkali metal bicarbonates and carbonates.

* * * * *